United States Patent
George et al.

(10) Patent No.: US 6,823,376 B1
(45) Date of Patent: Nov. 23, 2004

(54) METHOD AND SYSTEM FOR CAPTURING AND STORING SYSTEM CHANGES FOR APPLICATION TO MULTIPLE USERS AND SYSTEMS IN A HETEROGENEOUS SERVER ENVIRONMENT

(75) Inventors: Randall M. George, Austin, TX (US); Brian Keith Howe, Round Rock, TX (US); Stanley Allen Smith, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/299,952

(22) Filed: Apr. 26, 1999

(51) Int. Cl.[7] ............................................ G06F 15/177
(52) U.S. Cl. ...................... 709/221; 718/100; 709/200; 709/201; 709/220; 709/222
(58) Field of Search .................... 718/100; 709/220, 709/202, 222, 203, 221, 200, 330; 717/171, 173

(56) References Cited

U.S. PATENT DOCUMENTS

| | | | |
|---|---|---|---|
| 5,784,563 A | * | 7/1998 | Marshall et al. ............ 709/221 |
| 5,860,012 A | * | 1/1999 | Luu ............................ 717/175 |
| 6,026,438 A | * | 2/2000 | Piazza et al. ............... 709/221 |
| 6,029,246 A | * | 2/2000 | Bahr .......................... 713/200 |
| 6,101,601 A | * | 8/2000 | Matthews et al. ............. 713/2 |
| 6,125,402 A | * | 9/2000 | Nagarajayya et al. ....... 709/330 |
| 6,167,567 A | * | 12/2000 | Chiles et al. ............... 717/173 |
| 6,182,212 B1 | * | 1/2001 | Atkins et al. ................. 713/1 |
| 6,282,568 B1 | * | 8/2001 | Sondur et al. ............. 709/223 |
| 6,314,565 B1 | * | 11/2001 | Kenner et al. ............. 717/171 |
| 6,347,331 B1 | * | 2/2002 | Dutcher et al. ............ 709/203 |
| 6,351,771 B1 | * | 2/2002 | Craddock et al. ........... 709/227 |
| 6,442,684 B1 | * | 8/2002 | Lee et al. ..................... 713/1 |
| 6,449,642 B2 | * | 9/2002 | Bourke-Dunphy et al. . 709/222 |

* cited by examiner

*Primary Examiner*—Thomas Lee
*Assistant Examiner*—Lilian Vo
(74) *Attorney, Agent, or Firm*—Duke W. Yee; Jeffrey S. LaBaw; Patrick C. R. Holmes

(57) ABSTRACT

A method and system for capturing and storing system changes for application to multiple users and systems in a heterogeneous server environment is provided. A data processing system is initialized for a capture of an initial state of the data processing system. The data processing system is modified. The modified state of the data processing system is captured. The differences between the initial state and the modified state are stored as a set of configuration parameters in a depository, and the set of configuration parameters may be used to manage configurability of a data processing system within the distributed data processing system.

22 Claims, 10 Drawing Sheets

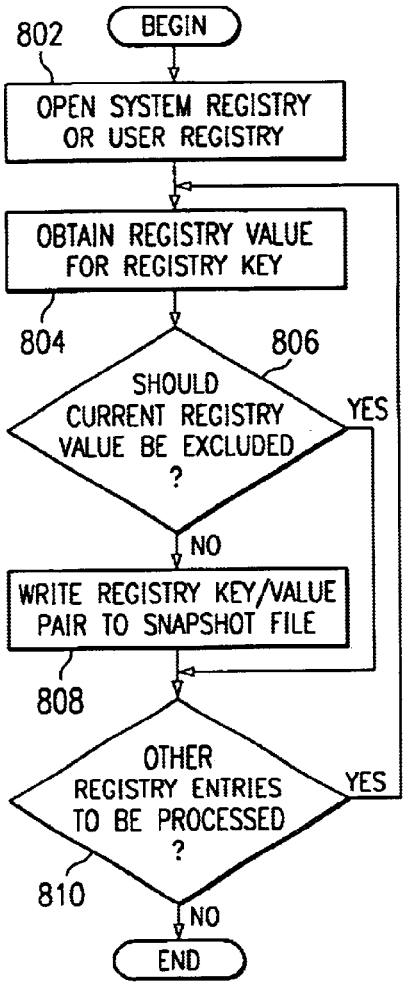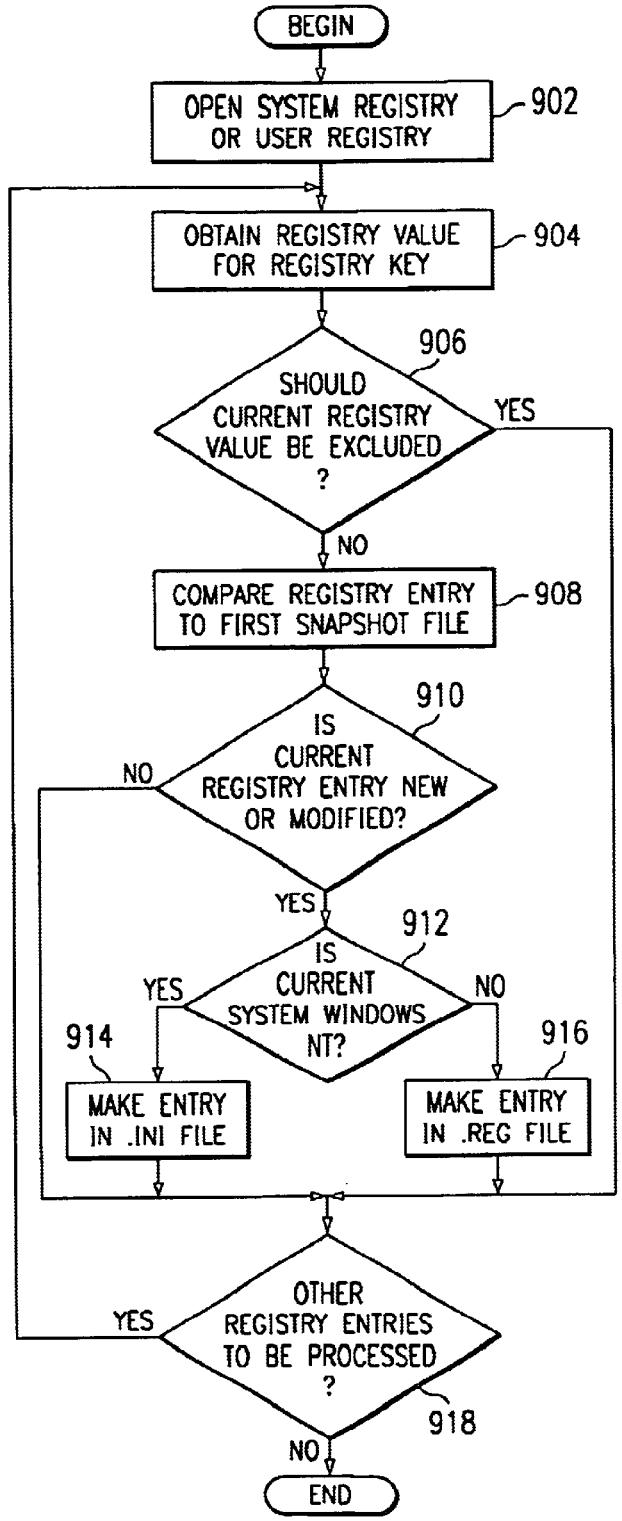

METHOD AND SYSTEM FOR CAPTURING AND STORING SYSTEM CHANGES FOR APPLICATION TO MULTIPLE USERS AND SYSTEMS IN A HETEROGENEOUS SERVER ENVIRONMENT

CROSS REFERENCE TO RELATED APPLICATIONS

The present invention is related to applications entitled METHOD AND APPARATUS TO UPDATE A WINDOWS REGISTRY FROM A HETEROGENEOUS SERVER, U.S. Pat. No. 6,347,331, issued Feb. 12, 2002; METHOD AND APPARATUS FOR DYNAMIC DISTRIBUTION OF SYSTEM FILE SYSTEM REGISTRY CHANGES IN A DISTRIBUTED DATA PROCESSING SYSTEM, Ser. No. 09/299,936; METHOD AND SYSTEM FOR MRNAGING WINDOWS DESKTOPS IN A HETEROGENEOUS SERVER ENVIRONMENT, U.S. Pat. No. 6,633,906, issued Oct. 14, 2003; METHOD AND SYSTEM FOR USER-SPECIFIC MANAGEMENT OF APPLICATIONS IN A HETEROGENEOUS SERVER ENVIRONMENT, U.S. Pat. No. 6,446,071, issued Sep. 3, 2002; and METHOD AND SYSTEM FOR MANAGING WINDOWS APPLICATIONS IN A HETEROGENEOUS SERVER ENVIRONMENT, Ser. No. 09/299,950, now abandoned, all of which are filed on even date hereof, assigned to the same assignee, and incorporated herein by reference.

BACKGROUND OF THE INVENTION

1. Technical Field

The present invention relates generally to an improved distributed data processing system and, in particular, to a method and data processing system for providing administrative management for customizable user environments within a distributed data processing system.

2. Description of Related Art

In distributed data processing systems, the client-server model is a well-known environment. In this model, the user of a computer utilizes a "client" system. The client system runs any of a number of computer operating systems to manage the basic functions that users execute, such as accessing files, executing programs, and system administration, as well as to serve as the base against which programs are written. Well-known client operating systems include Microsoft Windows 3.1, Windows for Workgroups, Windows 95, IBM® OS/2® Warp, Apple Macintosh, DOS, many variations of UNIX, and Microsoft Windows NT. The client system serves as the user's workstation, and it-may execute programs as well as store some user data.

The server system can also run any of a number of computer operating systems. Well-known server operating systems include, for example, Novell NetWare, IBM OS/2 Warp Server, IBM AS/400®, Microsoft Windows NT, and many variations of OSF UNIX. The server system is accessed by the client system for specific functions. The functions include, but are not limited to, storage and retrieval of data, storage and execution of applications, and storage of and access to user information.

The client-server model continues to evolve to meet the need for distributed resources. As personal computers have gained more functionality and reliability, end-users have improved their productivity through the use of a variety of distributed computing resources. While some enterprise data and legacy applications continue to be placed on reliable mainframe platforms, the need for distributed enterprise access to large numbers of applications and large amounts of data continues to grow.

Operating systems and computing hardware platforms have proliferated, and each combination of computer hardware and software addresses the need for a variety of price, performance, legacy compatibility, and features. Traditional PCs, such as desktop and laptop PCs, are designed to offer highly sophisticated end-user environments. The installation of workgroup computing software and complete application suites requires a computer with significant local storage and local networking capabilities. Network computers (NCs), on the other hand, offer a different type of versatility as they may provide limited access to Java™ and Windows™-based applications. NCs are typically implemented with only a general-purpose processor, a system memory, and a communications port. Therefore, NCs typically rely upon network access to provide dynamic, non-volatile data storage capability.

Each of the various implementations of the client-server model has advantages and disadvantages. Networked PCs have the advantage of providing extensive flexibility. In order to accommodate their need for computing resources, users may add peripherals and software applications directly to a PC, while a network administrator may provide other resources on the network for many users in a common fashion. The disadvantages include the immense burden placed on a network or system administrator in ensuring that the various PCs retain some semblance of a standard configuration. Many operating systems provide various levels of system administration capabilities for accomplishing such administrative tasks. However, as users become more technically sophisticated through everyday use of various computing devices, users demand more options in their access to data and to computing resources. For example, people who travel extensively or work at various locations may rely on the ability to have access to a common set of applications wherever they are located. Enormous costs and amounts of time may be spent in accommodating user preferences while pursuing corporate directives for the use of standard configurations.

Industry standards have been developed for both critical and common functions to aid in the implementation of a system containing different types of client systems accessing different types of server systems. The use of these standards on the client and server afford users the opportunity to carry out functions in a consistent manner on a variety of common client and server operating systems, thereby reducing administrative costs. For example, one of the activities that has been standardized is the "authentication" of users. Authentication refers to the process in which a user is validated as being able to complete a logon and/or access a system. Standard protocols have been defined within the X/Open Server Message Block (SMB) specification and the Open Systems Foundation (OSF) Distributed Computing Environment (DCE) specification. While many products and operating systems have been developed that utilize standard protocols, not all products have used the standards. Hence, enterprises confront the difficult challenge of cost-effectively maintaining system administrative knowledge of enterprise-wide computer configurations while allowing some amount of user-specific configuration flexibility within a variety of operating systems that use non-standard protocols and data file formats.

Windows-based applications using the Win32 API's are dominant applications today. These applications are executed on Windows workstations or workstations that A support the Win32 APIs in some form, yet many enterprises also use non-Window servers. In today's server-based environments, it is desirable to manage all users, applications, and data from a centralized location.

Thus, it would be advantageous to have an improved method and system for managing Windows applications in a non-Windows-based server environment.

SUMMARY OF THE INVENTION

A method and system for capturing and storing user and system changes for application to multiple users and systems in a heterogeneous server environment is provided. A data processing system is initialized for a capture of an initial state of the data processing system. The data processing system is modified. The modified state of the data processing system is captured. The differences between the initial state and the modified state are stored as a set of configuration parameters in a depository, and the set of configuration parameters may be used to manage configurability of a data processing system within the distributed data processing system.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 8 is a flowchart depicting a process for taking a snapshot of a registry on a client computer;

FIG. 9 is a flowchart depicting the process of comparing a modified registry on the client with a previously snapshotted registry;

DETAILED DESCRIPTION OF THE PREFERRED EMBODIMENT

Figure 1:
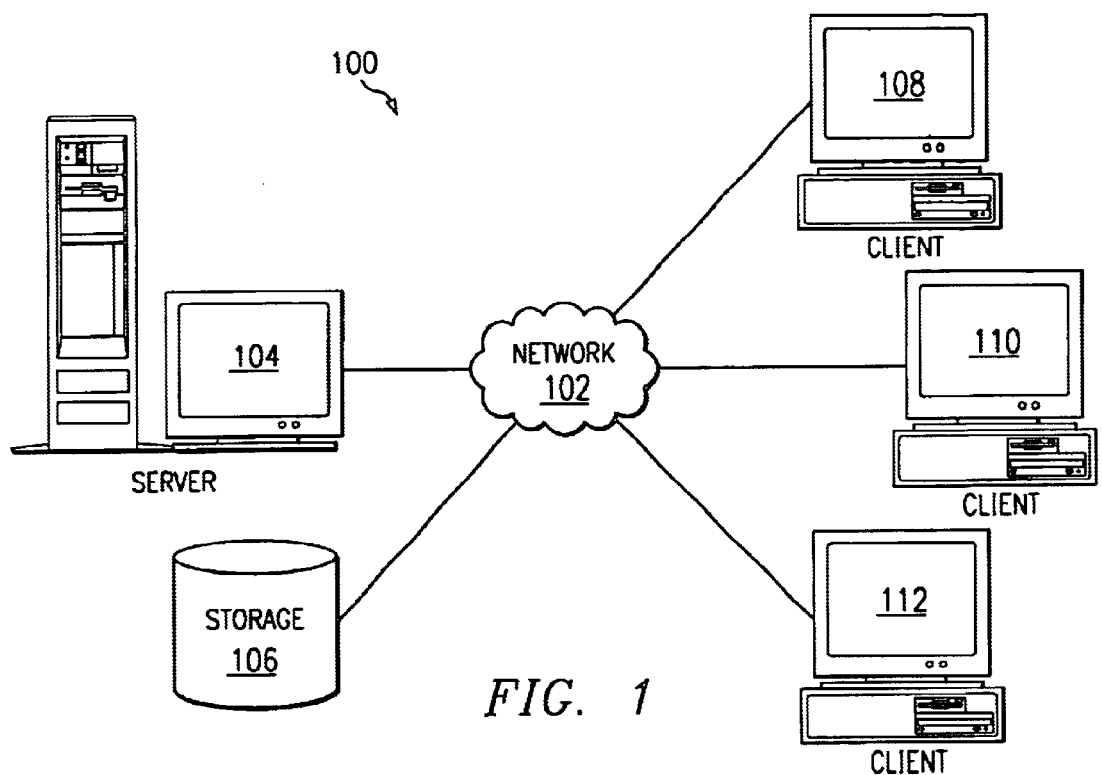
FIG. 1 is a pictorial representation of a distributed data processing system in which the present invention may be implemented.

With reference now to the figures, FIG. 1 depicts a pictorial representation of a distributed data processing system in which the present invention may be implemented. Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, a server 104 is connected to network 102 along with storage unit 106. In addition, clients 108, 110, and 112 also are connected to a network 102. These clients 108, 110, and 112 may be, for example, personal computers or network computers. For purposes of this application, a network computer is any computer, coupled to a network, which receives a program or other application from another computer coupled to the network. In the depicted example, server 104 provides data, such as boot files, operating system images, and applications to clients 108–112. Clients 108, 110, and 112 are clients to server 104. Distributed data processing system 100 may include additional servers, clients, and other devices not shown. In the depicted example, distributed data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, distributed data processing system 100 also may be implemented as a number of different types of networks, such as for example, an intranet, a local area network (LAN), or a wide area network (WAN). FIG. 1 is intended as an example, and not as an architectural limitation for the present invention.

A client running the same operating system as the server is said to be "native," whereas a client running a different operating system from the server is said to be "non-native." Given a Microsoft Windows NT client, examples of non-native servers may include, without limitation, IBM OS/2 Warp Server, IBM LAN Server, other types of Server Message Block (SMB) servers, as well as operating systems that run Open Systems Foundation (OSF) Distributed Computing Environment (DCE) software. An example of the latter is a DCE Cell running Distributed File System (DFS).

The term "homogenous" is commonly used to describe an environment in which the operating system of the client and the operating system of the server that is accessed by the client are the same. The term "heterogeneous" is commonly used to describe an environment in which the client operating system and the server operating system are different.

Figure 2:
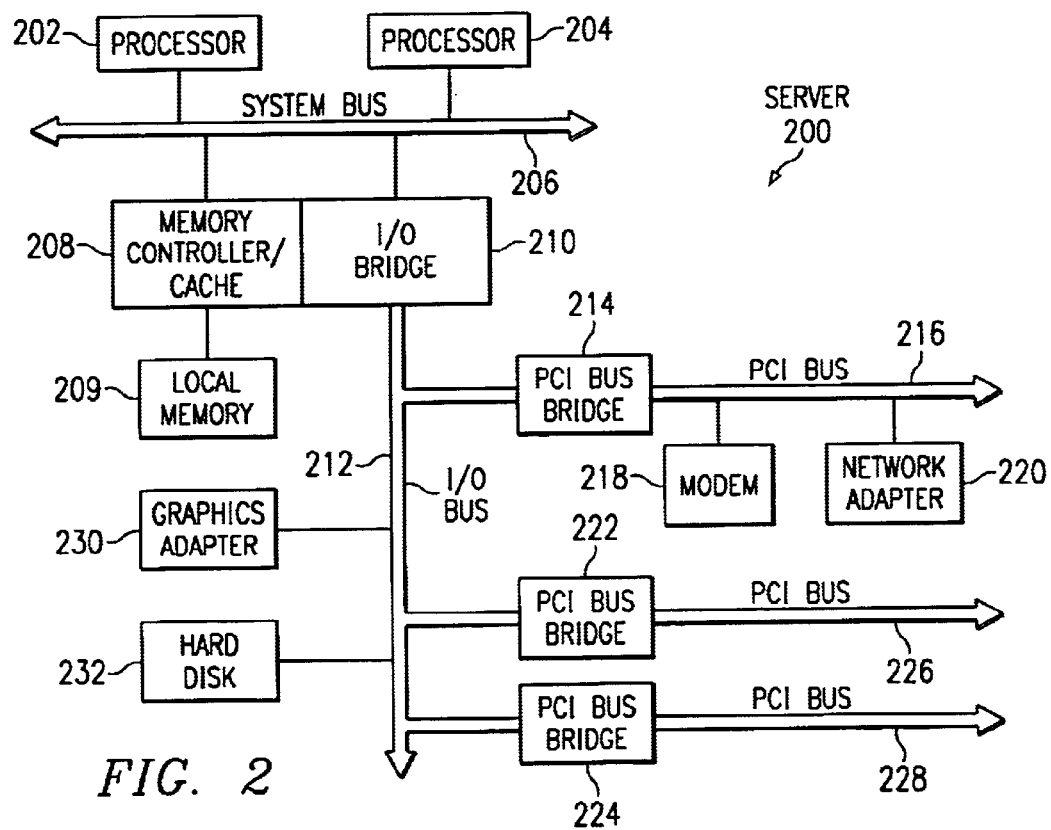
FIG. 2 is a block diagram depicting a data processing system that may be implemented as a server.

With reference now to FIG. 2, a block diagram depicts a data processing system that may be implemented as a server, such as server 104 in FIG. 1, in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, server 200 allows connections to multiple network computers. A memory-mapped graphics adapter 230 and hard disk 232 may also be connected to I/O bus 212 as depicted either directly or indirectly.

Those of ordinary skill in the art will appreciate that the hardware depicted in FIG. 2 may vary. For example, other peripheral devices, such as optical disk drives and the like also may be used in addition to or in place of the hardware depicted. The depicted example is not meant to imply architectural limitations with respect to the present invention.

The data processing system depicted in FIG. 2 may be, for example, an IBM RISC/System 6000 system, a product of International Business Machines Corporation in Armonk, N.Y., running the Advanced Interactive Executive (AIX) operating system.

Figure 3:
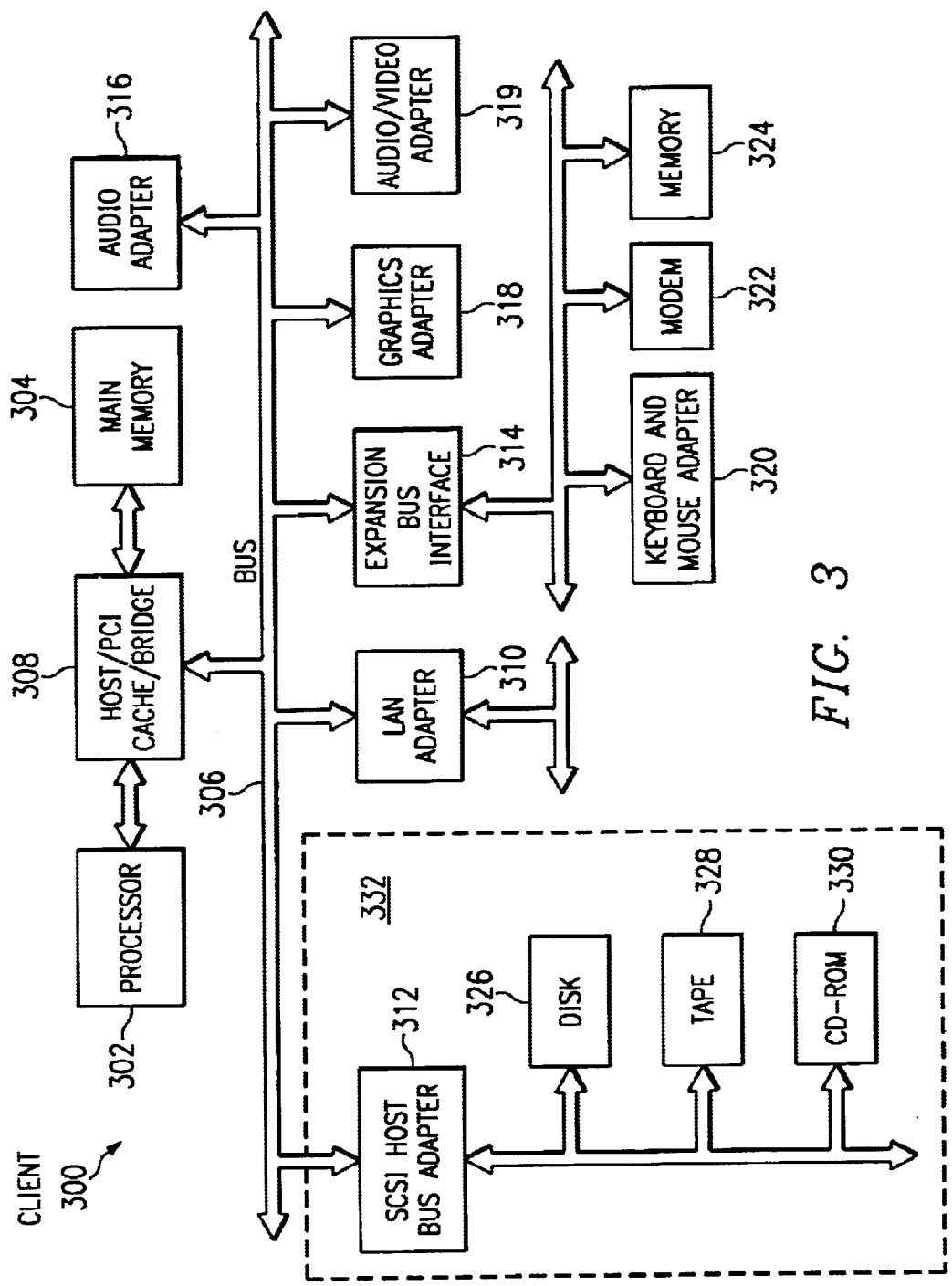
FIG. 3 is a block diagram illustrating a data processing system in which the present invention may be implemented.

With reference now to FIG. 3, a block diagram illustrates a data processing system in which the present invention may be implemented. Data processing system 300 is an example of a client computer. Data processing system 300 employs a peripheral component interconnect (PCI) local bus architecture. Although the depicted example employs a PCI bus, other bus architectures such as Micro Channel and ISA may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system such as OS/2, which is available from International Business Machines Corporation. "OS/2" is a trademark of International Business Machines Corporation. An object oriented programming system such as Java may run in conjunction with the operating system and provides calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

For example, data processing system 300, if optionally configured as a network computer, may not include SCSI host bus adapter 312, hard disk drive 326, tape drive 328, and CD-ROM 330, as noted by dotted line 332 in FIG. 3 denoting optional inclusion. In that case, the computer, to be properly called a client computer, must include some type of network communication interface, such as LAN adapter 310, modem 322, or the like. As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device which is configured with ROM and/or flash ROM in order to provide non-volatile memory for storing operating system files and/or user-generated data.

The depicted example in FIG. 3 and above-described examples are not meant to imply architectural limitations.

Individual user workstations are powered by operating systems that rely on a set of common system files that exist on each of the workstations. These common files are relied upon for specific operation of the system. As changes are made to the systems, these files are updated to capture and make the change persistent. A common file type used in operating systems that include the Windows operating systems are .INI and .DLL files.

The present invention addresses the problem of capturing the file changes made during operations such as the installation of an application or installation of a new driver on a system, and then saving them such that they can be merged into other systems in a network. Specific changes within the system files are captured at a granular level. By saving these and storing them at a location accessible by other systems in a network, a system employing the present invention may apply them to the existing files on the systems, i.e. distributing them along with applications to additional Windows systems in a network.

The present invention also addresses the problem of user-specific application files for individual users. By separating the system files from the user files, the user may roam between a series of different workstations and maintain a consistent application environment. The present invention also captures and splits the changes into between user-specific and system-specific changes so that the system changes may be applied per machine and the user changes may be applied per user.

Figure 4:
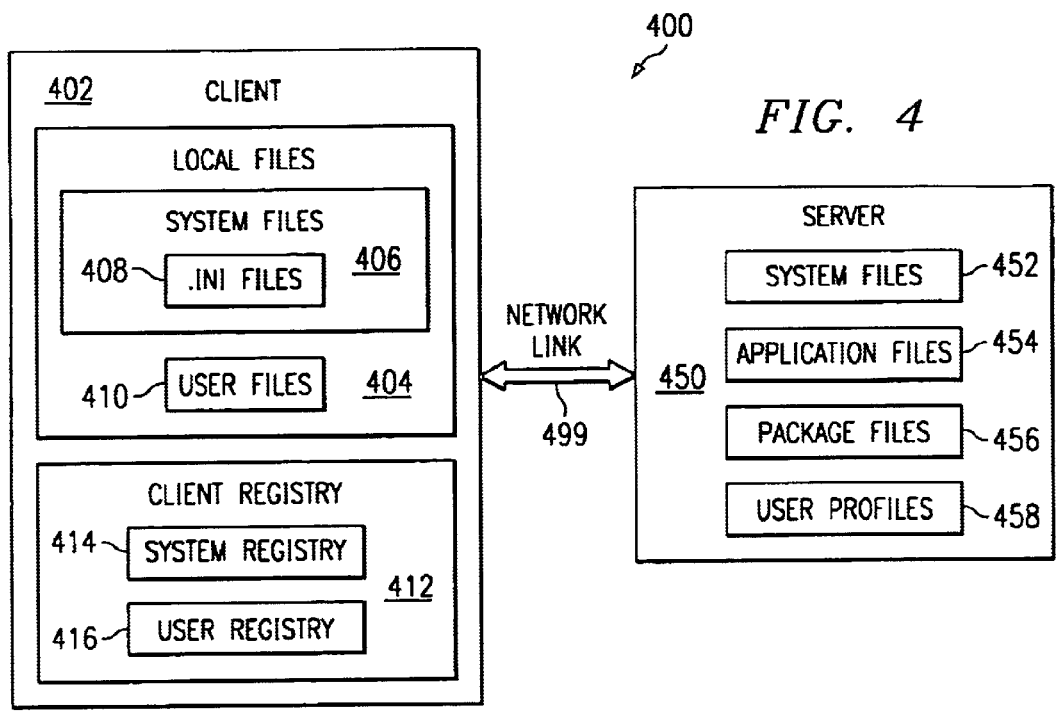
FIG. 4 is a block diagram depicting an example of the storage of pertinent information within a client-server environment.

With reference now to FIG. 4, a block diagram depicts an example of the storage of pertinent information within a client server environment that may implement the present invention. System 400 contains client 402 that communicates with server 450 across network link 499. Client 402 contains local files 404 consisting of such files as application files, data files, device drivers, operating system files, or other types of files. Local files 404 may include specific categories of files such as user files 410 and system files 406. User files 410 may be those application and data files that customize or configure client 402 in a personal manner for a specific user. System files 406 may include operating system and application files available for use to any user of client 402. System files 406 may include .INI files 408. In the DOS and Windows operating systems, the ".INI" file extension identifies an initialization file that contains user preferences and start up information about an application program.

Client 402 also contains client registry 412. The registry is a central hierarchical database in the Windows 9X and Windows NT operating systems. Windows 9X refers to Windows 95, Windows 98, and succeeding operating systems. The registry stores information necessary to configure a computer system for one or more users, applications, and hardware devices. The registry contains information that Windows 9X and Windows NT continually reference for operation, such as profiles for each user, the applications installed on the computer, the types of documents that each application may create, information about folders and icons, the type of hardware on the computer system, and the configuration of the input/output boards. Entries in registry 412 may be categorized as system-related entries and user-related entries shown as system registry 414 and user registry 416.

Server 450 contains sets of files that may be sent from server 450 to configure, client 402 upon startup of client computer. System file 452 may include system image files or other operating system files that provide boot-up capability for the client computer. Application file 454 contains application programs that may be executed on the client computer for various data processing capabilities. Package files 456 are files that enable a system administrator to manage applications from the server to decide whether specific users can access specific applications. An application package may contain one or more applications. An application package contains a collection of system files, user files (such as shortcuts on the desktop), system registry entries, and user registry entries, which together comprise any client machine change. A package may be as small as a single registry entry or a single file. User profiles 45B contains other information or files that may be sent from the server to a client to customize a client computer for a specific user. User-level changes, such as changes to the desktop, to the StartMenu, the user registry, etc., are captured and stored so that access to the applications, etc., can be managed on a per-user basis.

Figure 5:
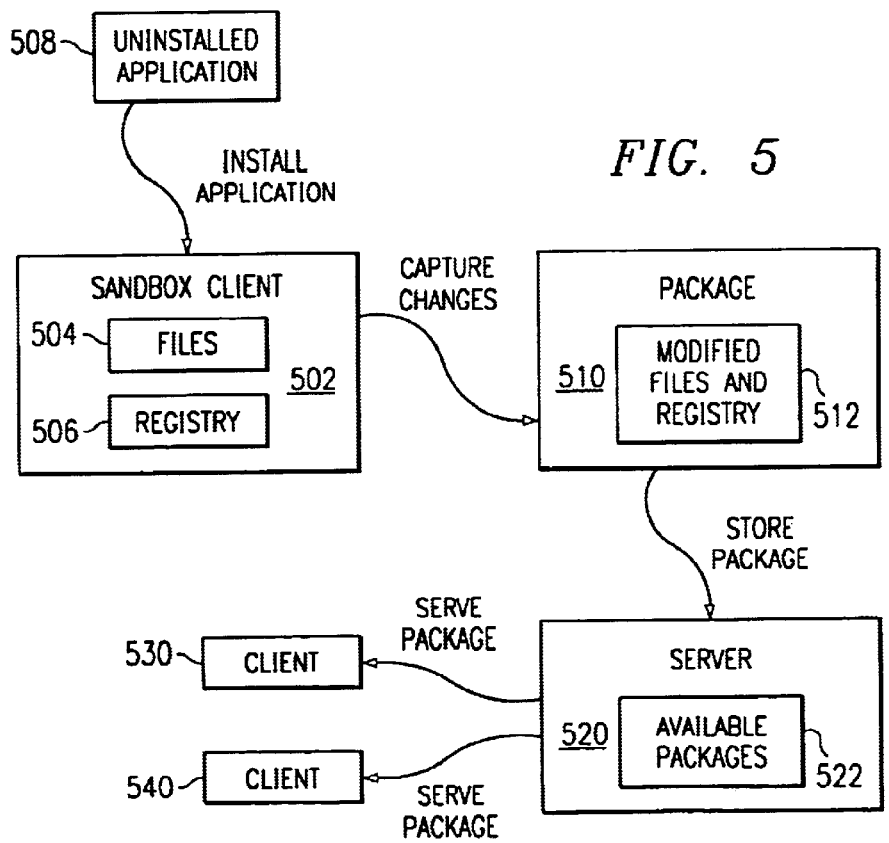
FIG. 5 is a block diagram depicting the overall process of capturing configuration information for customizing a client environment from a heterogeneous server.

With reference now to FIG. 5, a block diagram depicts the overall process of capturing configuration information for customizing a client environment from a heterogeneous server. Sandbox client 502 contains files 504 and registry 506. Using the metaphor of a sandbox as a container within which a structure may be molded and shaped in a customized manner, sandbox client 502 is a client within a specific domain with the capability for capturing modifications to the client and storing those modifications on the server.

At some point, a system administrator desires to provide access to an application for a user or class of users. The system administrator installs uninstalled application 508 onto sandbox client 502. During the installation process, files 504 and registry 506 on sandbox client 502 will be modified. These modifications are captured as modified files and registry 512 within package 510. Package 510 contains information necessary for recreating the environment within the sandbox client including the newly installed application. The package is stored as one of available packages 522 on server 520. As part of the user account administration procedures, system administrator provides access to a package for a user as part of the user's expected run-time environment. One or more applications may be present in a package. If the user logs on to client 530, one of the available packages may be served to client 530 during the users logon process. The package will provide the user with a familiar environment so that a user may be immediately productive on client 530 even if the user has never used that particular machine beforehand. The user has the ability to roam within the domain, and the system will serve the proper package to the user so that the user always has access to a familiar run-time environment. If the user logs on to client 540, then the same environment that is familiar to the user on other clients will follow the user to the new client.

Figure 6:
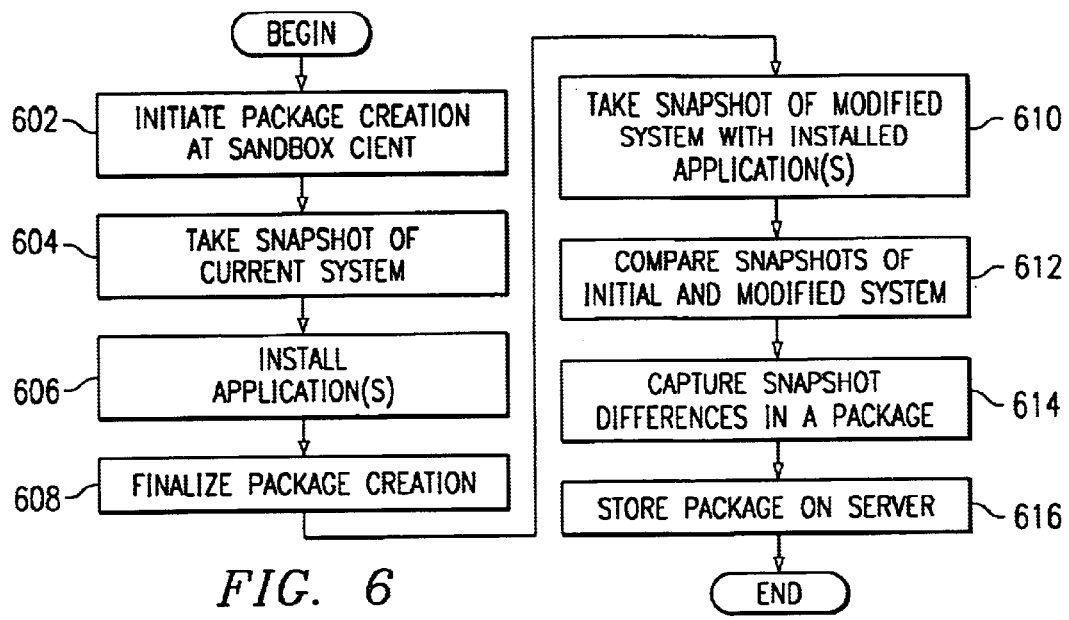
FIG. 6 is a flowchart depicting the process of creating a package according to the present invention.

With reference now to FIG. 6, a flowchart depicts the process of creating a package according to the present invention. The process begins when someone, such as a system administrator, initiates the creation of a package at a sandbox client (step 602). In response to the proper command, a snapshot is taken of the current system (step 604). Although other inputs may be considered, a snapshot consists primarily of four inputs: the current directory structure; the current .INI files: the current system registry; and the current user registry. In order to capture the current directory structure, a binary image is created from the persistent storage of the client. The binary image may contain such file information as the name, the size, the time last modified, etc. The current state of the .INI files are captured by creating a backup copy of all .INI files on the client. The current state of the system registry is captured by creating a text file of all entries within the system registry. The current state of the user registry is captured by creating a text file of all entries within the user registry.

The process continues by installing an application on the client (step 606). At this stage, a single application or multiple applications may be installed on the client, and the totality of the changes to the system can be captured. It should be noted that other system changes may be made to the client other than the installation of an application. For example, a device driver may be added or installed on the client, and in so doing, the current state of the system will be changed in a manner that may be captured by the method of the present invention. Other changes may be applied to the current system, such as a batch-driven change to the registry.

Once the system has been modified in the desired manner, the package creation is finalized through the proper commands or command sequence (step 608). In response, another snapshot is taken of the state of the modified system with the installed applications (step 610). The snapshots of the initial and modified system are compared (step 612), and the differences between the snapshots are captured in a package (step 614). The capture of the snapshot differences into a package is described in greater detail further below. The process then stores the package on the appropriate server (step 616).

With reference now to FIGS. 7A-7J, a series of block diagrams depict the three phases of creating a package on a sandbox client. The sandbox client shown in FIGS. 7A-7J is similar to client 402 in FIG. 4 and client 502 in FIG. 5. The creation of a package has three basic phases. The first phase consists of the steps taken when the creation of the package is first initiated. The second phase of the process consists of the installation of an application or other system changes. The third and final phase of the creation of a package consists of the finalization steps and storage of the package on the server.

Figure 7A:
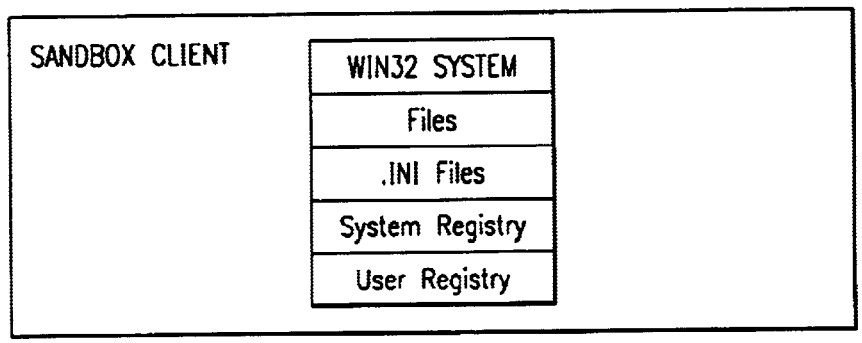
FIGS. 7A-7J is a series of block diagrams depicting the three phases of creating a package on a sandbox client.
Figure 7B:
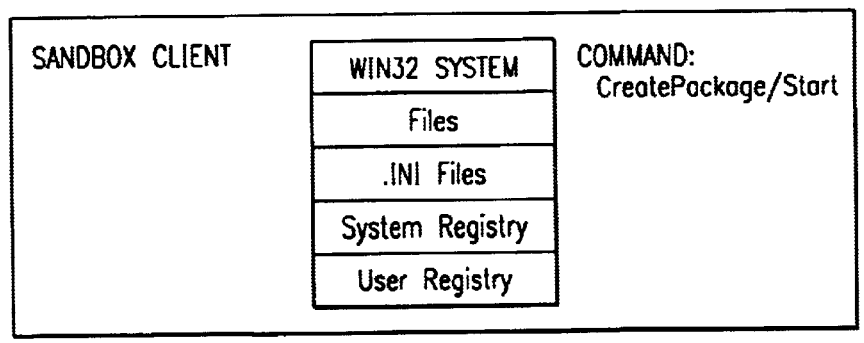
Figure 7C:
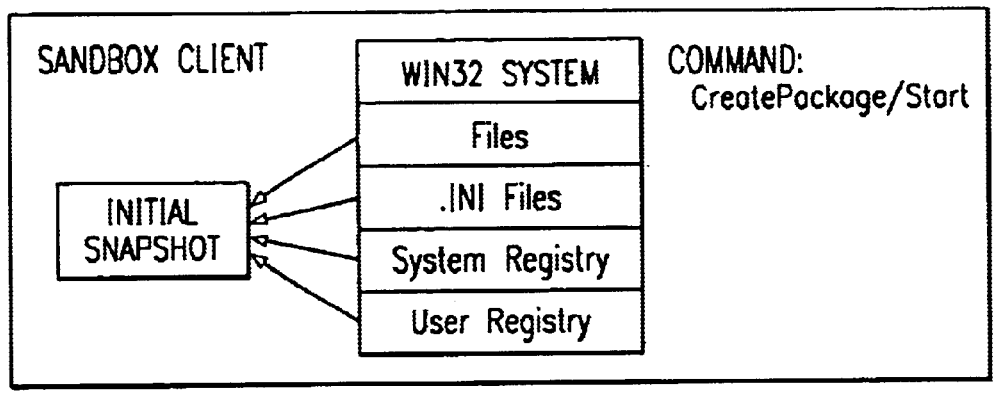

FIGS. 7A-7C depict the first phase of the process. FIG. 7A shows the unmodified current state of the system. FIG. 7B shows the entry of a command that begins the process to create the package. FIG. 7C shows a snapshot being taken of the current state of the system.

Figure 7D:
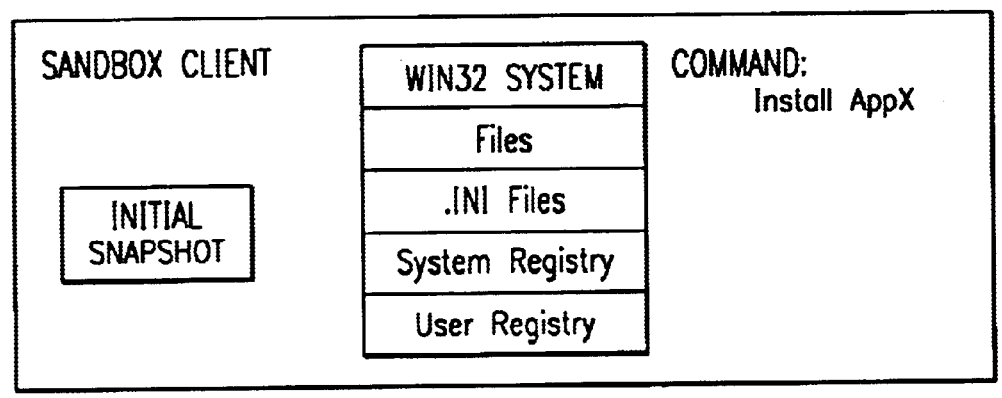
Figure 7E:
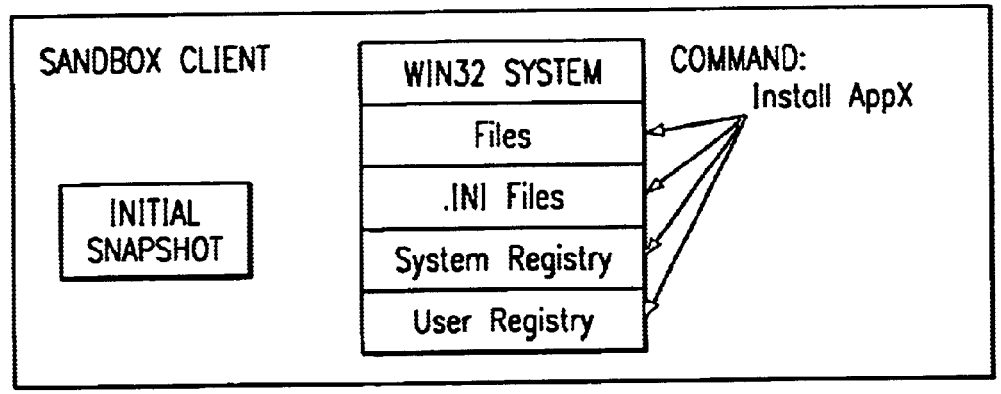

FIGS. 7D-7E show the steps of the second phase of the process. FIG. 7D shows the entry of a command to install an application. FIG. 7E shows the modifications being made to particular portions of the system.

Figure 7F:
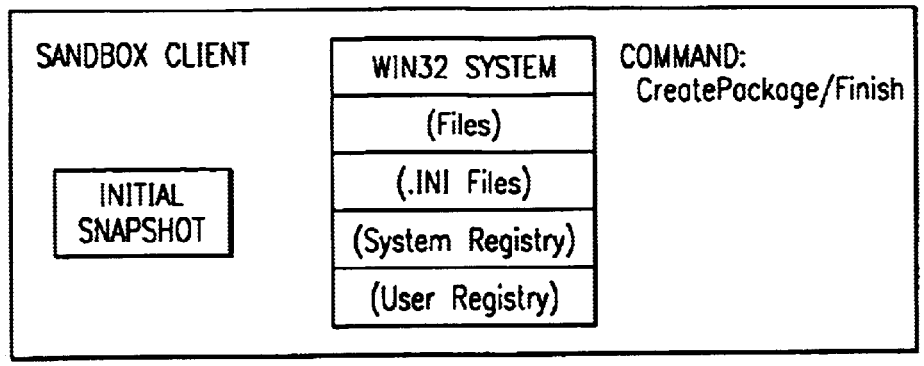
Figure 7G:
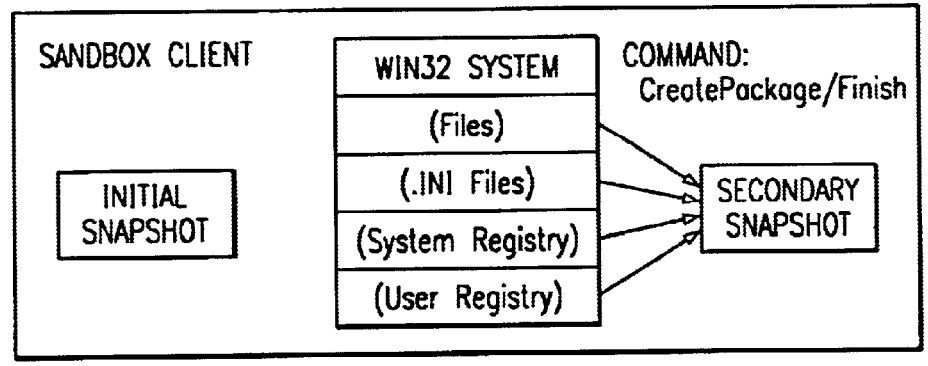
Figure 7H:
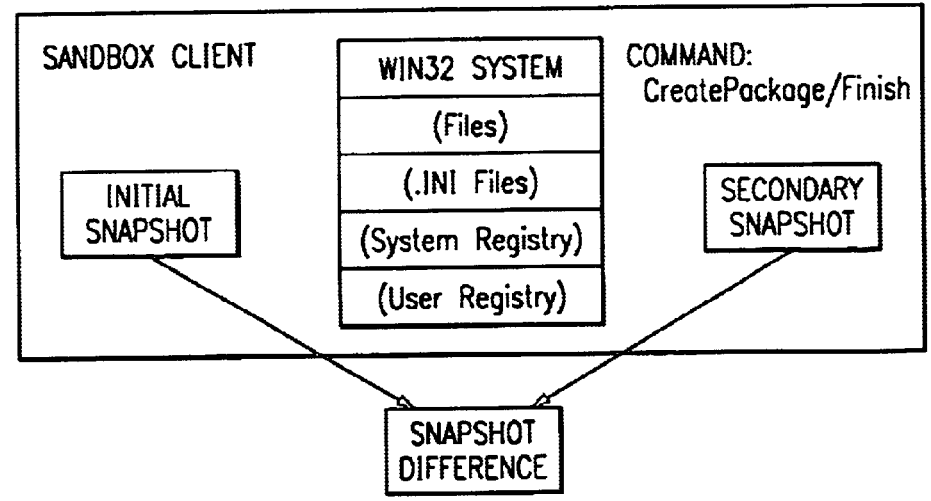
Figure 7I:
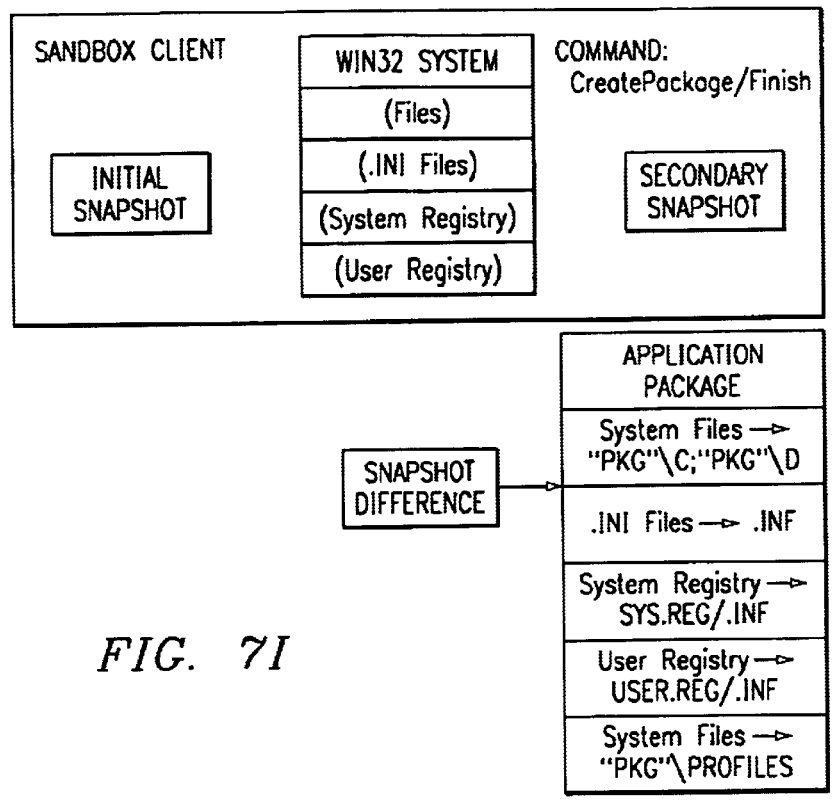
Figure 7J:
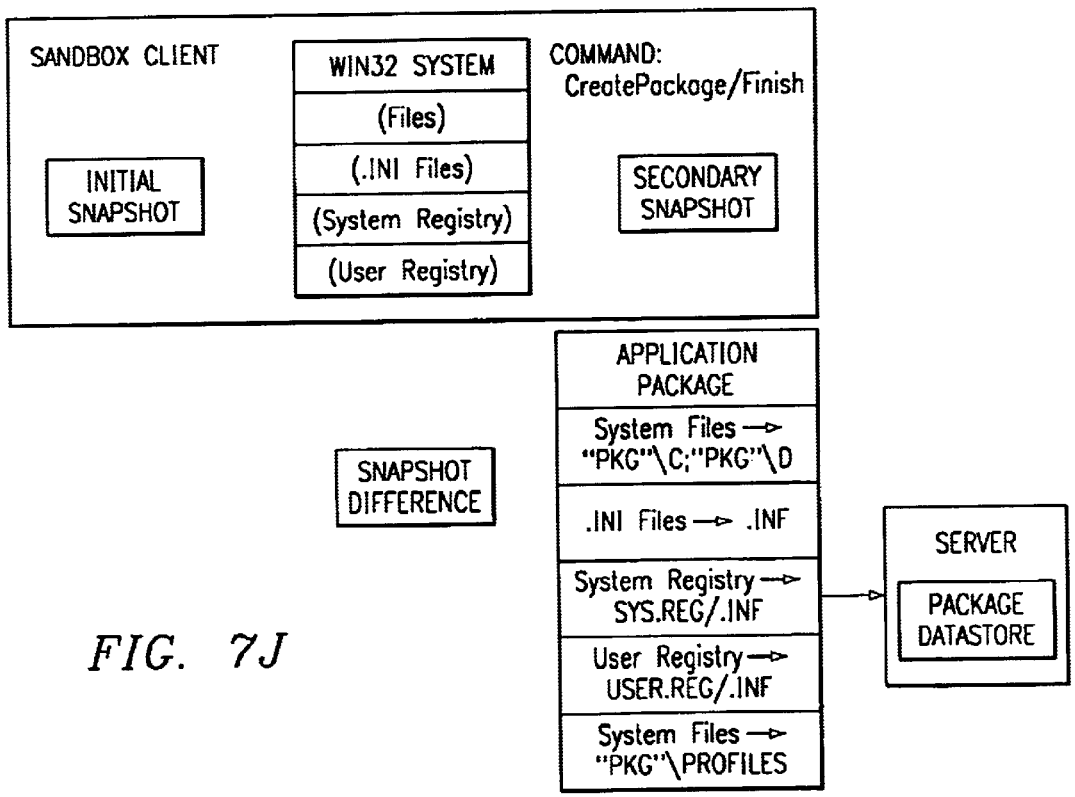

FIGS. 7F-7J show the final phase of the creation of a package. FIG. 7F shows the entry of a command that initiates the finalization process for the package. FIG. 7G shows a snapshot being created of the state of the modified system. FIG. 7H shows a difference process or comparison of the two snapshots. FIG. 7I shows the capture of the snapshot differences in a package. FIG. 7J shows the storage of the created package in the appropriate location on a server.

With reference now to FIG. 8, a flowchart depicts a process for taking a snapshot of a registry on a client computer. The process begins by opening the system registry or user registry (step 802). The process branches through the registry entries using the registry keys to obtain registry values (step 804). A determination is made of whether the current registry value should be excluded (step 806). If not, then the registry key/value pair is written to the snapshot file (step 808). If the registry should be excluded, then the process skips step 808.

The utility that is creating a package receives input that guides the utility in determining what values to include or exclude from the package. The input may be a configuration file for the package creation utility so that the system administrator may include and exclude directories, files, and registry keys from the snapshots. The configuration file may be in the form of a .INI file, which may vary for every application package that is created.

There are three reasons to exclude a directory, file or registry key from the snapshots. First, there may be access restrictions to the directory, file, or registry key. These restrictions cause errors for the package creation utility when the utility is executed. Second, there may be directories, files, or registry keys that change every time the system is rebooted, and these changes would be captured in the package as installation changes if the sandbox client were rebooted during the process of creating the package. Third, there may be directories or registry keys that contain unnecessary data. For example, if a directory on the system has a large amount of data that does not affect the application, the directory should be excluded from the snapshots. Excluding these directories and keys may improve the performance of the utility.

A determination is then made as to whether there are other registry entries to be processed (step 810). If so, then the process branches back to step 804 to obtain another registry entry. If there are no other registry entries to be processed, then the process is completed.

With reference now to FIG. 9, a flowchart depicts the process of comparing a modified registry on the client with a previously snapshotted registry. The process begins by opening the system registry or the user registry (step 902). The process branches through the registry entries by stepping through the registry keys to obtain registry values (step 904). A determination is made as to whether a registry value should be excluded (step 906). If not, then the registry entry is compared to the registry entries in the first snapshot file (step 908). The determination of inclusion or exclusion of registry keys may be input from a configuration file for the package creation utility.

A determination is then made as to whether the current registry is new or modified (step 910). If so, then a determination is made as to whether the current client system is running under Windows NT (step 912). If so, then an entry corresponding to the current registry entry is placed in the .INF file (step 914). If the current client is operating under Windows 9X, then an entry is made in the .REG file that corresponds to the current registry entry (step 916). A determination is then made as to whether there are other registry entries to be processed (step 918). If so, then the process branches back to step 904 to process another registry entry. If there are no other registry entries to be processed, then the process terminates. If the registry entry that was currently being processed should be excluded or if the registry entry is identical to the corresponding registry entry in the first snapshot file, then the process skips any other processing steps related to the current registry entry and branches to step 918 to determine whether there are any other registry entries to be processed.

Figure 10:
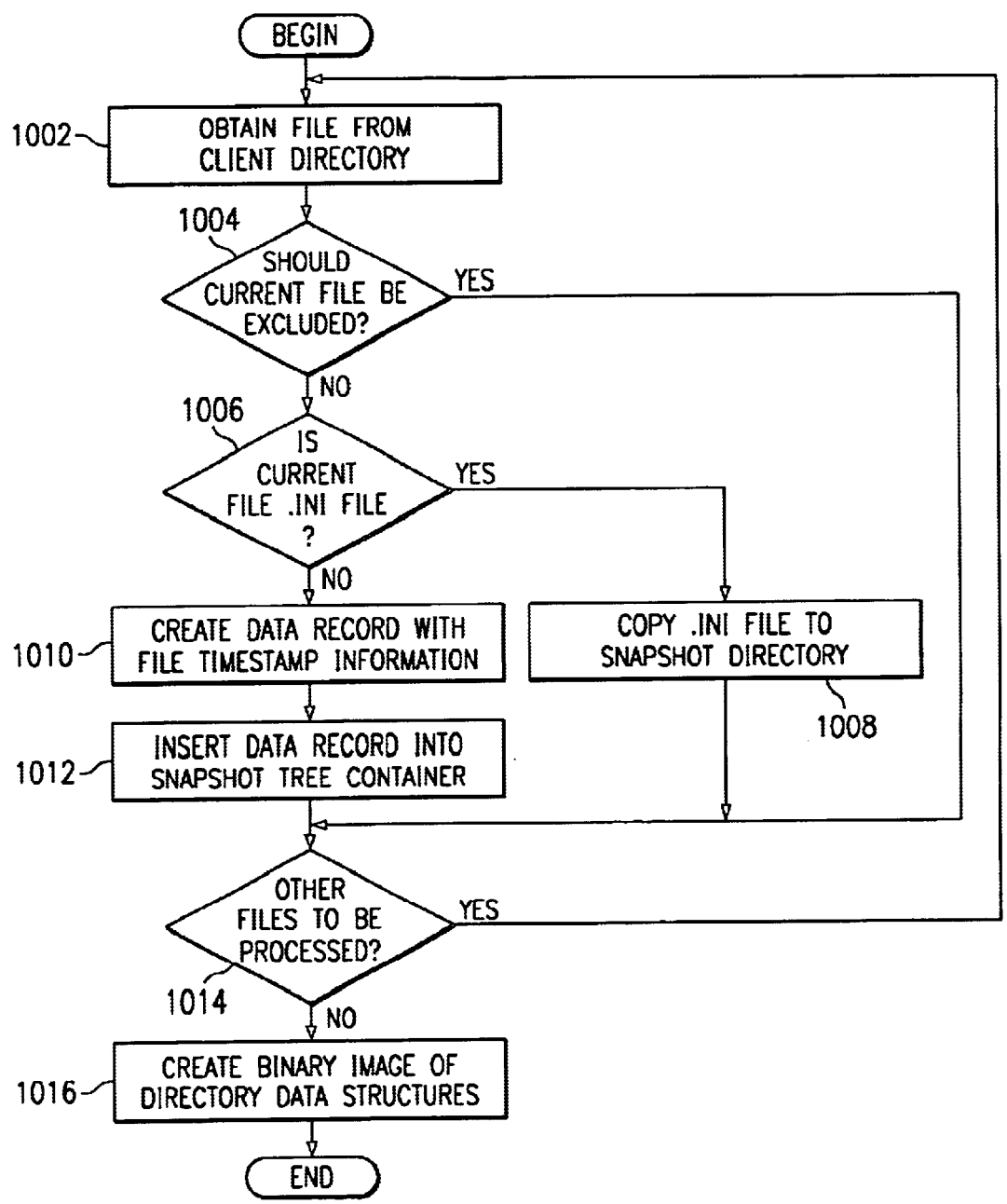
FIG. 10 is a flowchart depicting a process for taking a snapshot of the user and system files as a portion of a snapshot of the initial state of the client system.

With reference now to FIG. 10, a flowchart depicts a process for taking a snapshot of the user and system files as a portion of a snapshot of the initial state of the client system. The process begins by obtaining a file from a client directory (step 1002). A determination is made as to whether the current file should be excluded (step 1004). If so, then no other processing is performed on the current file. If not, then a determination is made as to whether the current file is a .INI file (step 1006). If so, then the current file is copied to the proper snapshot directory (step 1008). No other processing is performed on the current file, and the process branches so that other files may be processed.

If the current file is not a .INI file, then a data record is created with the timestamp information for the file from the directory (step 1010). The data record is then inserted into a snapshot tree container for later retrieval and comparison (step 1012). A determination is then made as to whether there are other files on the client in its various directories that require processing (step 1014). If so, then the process branches back to step 1002 in order to obtain another file for processing. If there are no other files that require processing, then the process completes by creating a binary image of the directory data structures (step 1016).

Figure 11:
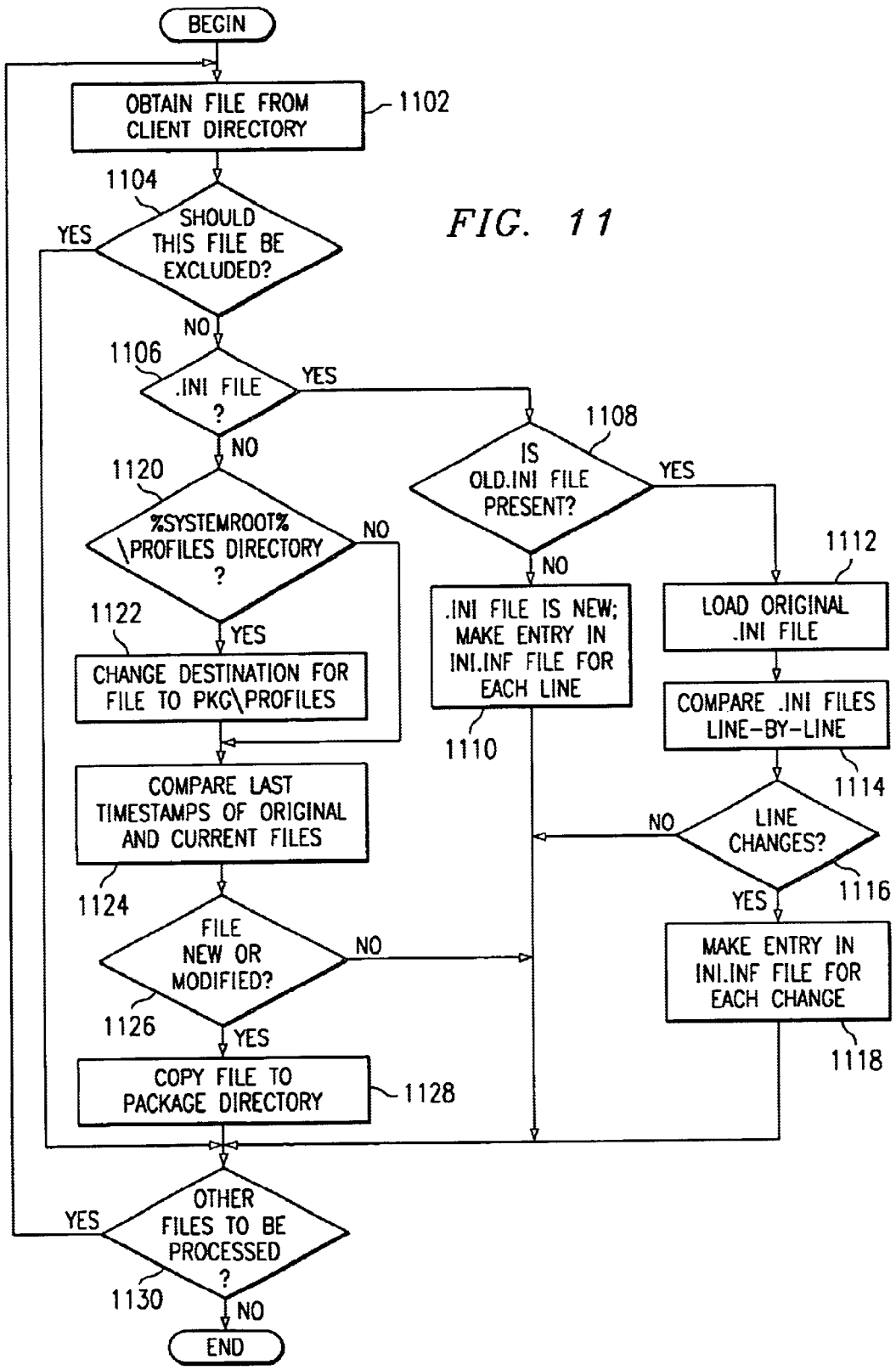
FIG. 11 is a flowchart depicting a process for capturing changes to user files and system files by comparing the state of the modified system to the previously captured initial state of the system.

With reference now to FIG. 11, a flowchart depicts a process for capturing changes to user files and system files by comparing the state of the modified system to the previously captured initial state of the system. The process begins by obtaining a file from a client directory (step 1102). A determination is then made as to whether this file should be excluded (step 1104). If so, then there is no other processing that is required for the current file, and the process branches to check for other files to be processed. If this file should not be excluded, then a determination is then made as to whether the file is a .INI file (step 1106). If so, then a determination is then made as to whether a corresponding .INI file was present during the initial snapshot (step 1108).

If a corresponding .INI file was not present during the initial snapshot, then the current file is newly created, and an entry is created in the appropriate INI.INF file for each line that is present within the .INI file (step 1110). Once the processing of the current .INI file is completed, then the process branches to check for other files that must be processed.

If the current .INI file has a corresponding .INI file in the initial snapshot, then the original .INI file is loaded into memory (step 1112). A comparison is then made between each line in the original .INI file and the .INI file that is currently being processed (step 1114). A determination is then made: as to whether there are any differences between the lines in the two .INI files (step 1116). If so, then an entry is made in the appropriate INI.INF file for each difference between the two files (step 1118).

The process then continues with a determination as to whether there are other files on the client computer that require processing in the difference operation or comparison with the initial snapshot (step 1130). If not, the process terminates. If there are other files to be processed, then the process branches back to step 1102 to obtain another file from the client system. If there are no differences between the original .INI file and the .INI file that is currently being processed, then the process continues from step 1116 to step 1130 in order to process any other files that may be remaining to be processed on the client system.

If the current file being processed is determined not to be a .INI file in step 1106, a determination is then made as to whether the file is a user type file or a system type file (step 1120). User type files are stored in the directory "%SYSTEMROOT%PROFILE". "%SYSTEMROOT%" is a Windows environment variable. If the current file is a system type file, then the potential destination directory for the file changed to a system file directory (step 1122). If it is a user file, then the rest of the destination directory for the file is changed to a user file directory. The destination directory changes depending on which type of file it is. After the destination directory is set for the system file, or if the current file is a user type of file, then a comparison is made between the timestamp information of the original file and the file that is currently being processed (step 1124). If the file is determined not to be a new or modified file (step 1126), then the process for the current file is completed.

If the current file is determined to be a new or modified file, then the file is copied to the appropriate package directory according to the type of file, either user type file or system type file (step 1128). The process then continues to determine whether there are other files that require further processing. If not, then the process of comparing the state of the files in the first and second snapshots is completed.

The advantages of the present invention should be apparent in light of the detailed description of the invention provided above. The advantage is achieved from the mechanism that captures these changes at a granular level during a standard application install or other change to a system. By converting them to a form usable at the systems to be updated and storing them at a server, an effective mechanism exists to push or pull changes specific to an individual application or device driver (or other system change) down to another system in a network and make the appropriate change. Thus, changes from a specific application in a specific package may be distributed to other systems in the network.

Another advantage of the present invention is that by separating out user-specific and system-specific files and registries, a user may move throughout the network and have a common application environment at each workstation. The user-unique information associated with an application is preserved at the server and is available at each workstation the user may utilize. For the specific situation of Windows applications, the present invention enables Windows application users at Windows workstations to roam between different systems while being managed from a heterogeneous server environment.

An additional advantage is that user-specific files will not be distributed to each individual workstation in the network along with the system application files. By keeping a single version of the application files at an accessible location in the network, the files are always current and are available to the user when accessing the application from the application from anywhere in the network.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such as a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for identifying and storing changes to a data processing system within a distributed data processing system, the method comprising the computer-implemented steps of:

initializing the data processing system for a capture of an initial state of the data processing system;

modifying the data processing system;

capturing a modified state of the data processing system; and storing differences between the initial state and the modified state as a set of configuration parameters in a depository wherein the differences are separated into system-specific changes and user-specific changes;

wherein the system specific changes are applied on a per-system basis and the user-specific changes are applied on a per-user basis;

wherein the differences between the initial state and the modified state comprise differences between user files, system files, user registries, and system registries; and wherein the differences between user files and differences between user registries may be used to manage configurability of an application on a per-user basis.

2. The method of claim 1 wherein the distributed data processing system is a heterogeneous client-server system.

3. The method of claim 1 wherein the data processing system is a Windows-based system.

4. The method of claim 1 wherein a state of the data processing system is captured by performing a snapshot of data within the data processing system.

5. The method of claim 4 wherein the snapshot may be configured to include or to exclude portions of data within the data processing system.

6. The method of claim 1 wherein the differences between system files and differences between system registries may be used to manage configurability of the application on a per-system basis.

7. The method of claim 1 wherein the differences between the initial state and the modified state comprise differences between .INI files.

8. The method of claim 7 wherein the differences between .INI files is captured line-by-line.

9. The method of claim 1 wherein the data processing system is modified by installing an application.

10. The method of claim 1 wherein the data processing system is modified by changing a registry file.

11. The method of claim 1 wherein the data processing system is modified by changing a .INI file.

12. An apparatus for identifying and storing changes to a data processing system within a distributed data processing system, the apparatus comprising:

initializing means for initializing the data processing system for a capture of an initial state of the data processing system;

modifying means for modifying the data processing system;

capturing means for capturing a modified state of the data processing system; and storing means for storing differences between the initial state and the modified state as a set of configuration parameters in a depository, wherein the differences are separated into system-specific changes and user-specific changes;

wherein the system specific changes are applied on a per-system basis and the user-specific changes are applied on a per-user basis;

wherein the differences between the initial state and the modified state comprise differences between user files, system files, user registries, and system registries; and wherein the differences between user files and differences between user registries may be used to manage configurability of an application on a per-user basis.

13. The apparatus of claim 12 wherein the distributed data processing system is a heterogeneous client-server system.

14. The apparatus of claim 12 wherein the data processing system is a Windows-based system.

15. The apparatus of claim 12 wherein a state of the data processing system is captured by performing a snapshot of data within the data processing system.

16. The apparatus of claim 15 wherein the snapshot may be configured to include or to exclude portions of data within the data processing system.

17. The apparatus of claim 12 wherein the differences between system files and differences between system registries may be used to manage configurability of the application on a per-system basis.

18. The apparatus of claim 12 wherein the differences between the initial state and the modified state comprise differences between .INI files.

19. The apparatus of claim 18 wherein the differences between .INI files is captured line-by-line.

20. The apparatus of claim 12 wherein the data processing system is modified by installing an application.

21. The apparatus of claim 12 wherein the data processing system is modified by changing a registry file.

22. The apparatus of claim 12 wherein the data processing system is modified by changing a .INI file.

* * * * *

UNITED STATES PATENT AND TRADEMARK OFFICE
CERTIFICATE OF CORRECTION

PATENT NO. : 6,823,376 B1
DATED : November 23, 2004
INVENTOR(S) : George et al.

It is certified that error appears in the above-identified patent and that said Letters Patent is hereby corrected as shown below:

Column 1,
Line 17, after "SYSTEM FOR" delete "MRNAGING" and insert -- MANAGING --.

Signed and Sealed this

Twentieth Day of December, 2005

JON W. DUDAS
*Director of the United States Patent and Trademark Office*